United States Patent
Berry et al.

(10) Patent No.: US 7,814,125 B2
(45) Date of Patent: Oct. 12, 2010

(54) METHODS FOR FACILITATING APPLICATION DEVELOPMENT

(75) Inventors: Brian D. Berry, Pleasant Valley, NY (US); Noah G. Sack, Sloatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/856,128

(22) Filed: Sep. 17, 2007

(65) Prior Publication Data

US 2008/0109410 A1    May 8, 2008

Related U.S. Application Data

(63) Continuation of application No. 10/942,530, filed on Sep. 15, 2004.

(51) Int. Cl.

| G06F 7/00 | (2006.01) |
|---|---|
| G06F 17/30 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 9/44 | (2006.01) |

(52) U.S. Cl. ............... 707/803; 707/802; 707/790; 715/762; 715/210; 715/700; 715/200; 717/100

(58) Field of Classification Search .......... 707/3, 707/803, 802, 790; 717/100; 715/762, 210, 715/700, 200

See application file for complete search history.

(56) References Cited

U.S. PATENT DOCUMENTS 5,212,787 A    5/1993    Baker et al.

(Continued)

OTHER PUBLICATIONS

UIUC, [online]; [retrieved on Nov. 28, 2006]; retrieved from the Internet http://st-www.cs.uiuc.edu/users/smarch/st-docs/mvc.html, Burbeck, Steve, "Applications Programming in Smalltalk-80(TM): How to use Model-View-Controller" 1992. pp. 1-11, Park Place Systems.

(Continued)

Primary Examiner—Brent Stace
(74) Attorney, Agent, or Firm—Yee & Associates, P.C.; Arthur J. Samodovitz (57) ABSTRACT

Application development is facilitated by initializing a page token in response to receiving a request. The page token comprises an abstract model component containing a specification for obtaining data designated to be sent in a response to the request or a specification for updating data obtained from the request, and also a view component for providing referential format specifications for data provided in the abstract model component. The page token is passed between at least two components of a modified model-view-controller architecture via a standard interface. The components include a user interface controller, a user interface builder implementing a first standard interface, an application layer implementing a second standard interface, a data access manager implementing a third standard interface, and at least one data access utility implementing a fourth standard interface. Business logic is applied to contents of the page token as a result of the passing, and a response is presented to the request based upon results of applying the business logic.

19 Claims, 3 Drawing Sheets

U.S. PATENT DOCUMENTS

| | | | |
|---|---|---|---|
| 5,950,190 | A | 9/1999 | Yeager et al. |
| 6,161,136 | A | 12/2000 | Hyndman et al. |
| 6,289,382 | B1 | 9/2001 | Bowman-Amuah |
| 2002/0143800 | A1 | 10/2002 | Lindberg et al. |
| 2003/0145305 | A1* | 7/2003 | Ruggier ............... 717/100 |
| 2003/0197726 | A1 | 10/2003 | Weitzman |
| 2004/0046789 | A1* | 3/2004 | Inanoria ............... 345/748 |
| 2006/0143182 | A1* | 6/2006 | Meadows ............... 707/10 |

OTHER PUBLICATIONS

UCSB, [online]; [retrieved on Nov. 28, 2006]; retrieved from the Internet http://www.ccmrc.ucsb.edu/~stp/PostScript/mvc.pdf, Krasner, Glenn et al., "A Description of the Model-View-Controller User Interface Paradigm in the Smalltalk-80 System"1998, pp. 1-34, Park Place System, Mountain View, California.

Java-Sun, [online]; [retrieved on Nov. 28, 2006]; retrieved from the Internet http://java.sun.com/blueprints/patterns/MVC-detailed.html, "Java BluePrints Model-View Controller", 2000-2002, pp. 1-5. Sun Microsystems Inc.

* cited by examiner

METHODS FOR FACILITATING APPLICATION DEVELOPMENT

CROSS REFERENCE TO RELATED APPLICATION

This application is a continuation of U.S. patent application Ser. No. 10/942,530 filed on Sep. 15, 2004, the disclosure of which is hereby incorporated by reference herein in its entirety.

FIELD OF THE INVENTION

The present invention relates generally to application development, and more particularly, to methods for facilitating application development using a modified Model-View-Controller architecture.

BACKGROUND OF THE INVENTION

Object-oriented programming is a popular means for developing applications. Object-oriented programming is implemented by a special language such as Java, C++, Smalltall™, etc. and refers to a type of programming that enables programmers to define a data type of a data structure, as well as operation functions to be applied to the data structure. In this manner, the data structure becomes an object that includes the data and its functions. By design, object-oriented programs are easily modified as application changes are needed (e.g., a new object can be created that inherits features of existing objects), although they require substantial amounts of complex code even for simple applications.

Advanced object-oriented programming techniques provide the ability to better manage program code, as well as reduce the complexity of the code, by compartmentalizing the code into organized 'chunks' or by implementing a general pattern during code development. One general pattern used is the Model-View-Controller (MVC) architecture. In a programming environment, the Model-View-Controller architecture distinguishes between a model (the data the user is manipulating along with its associated business logic), a view (a graphical representation of the data), and a controller (the mechanisms by which the user manipulates the data). The controller may be used to change the state of the model which, in turn, is displayed in the view. Segregating these components enables developers to re-use object code thereby reducing the time it takes to develop applications. Despite this, the MVC model still requires rather extensive development even for simple applications.

What is desirable, therefore, is the ability to provide rapid application development and simple application integration where most of the development is left to simple configuration rather than complex code development.

SUMMARY OF THE INVENTION

Embodiments of the invention include methods for facilitating application development. The methods include initializing a page token in response to receiving a request. The page token comprises an abstract model component containing a specification for obtaining data designated to be sent in a response to the request or a specification for updating data obtained from the request, and also a view component operable for providing referential format specifications for data provided in the abstract model component. The methods also include passing the page token between at least two components of a modified model-view-controller architecture. The components include a user interface controller, a user interface builder, an application layer, a data access manager, concrete models, and the standard interfaces between these components. The methods further include applying business logic to contents of the page token as a result of the passing, and presenting a response to the request based upon results of applying the business logic.

Other methods according to embodiments will be or become apparent to one with skill in the art upon review of the following drawings and detailed description. It is intended that all such additional methods be included within this description, be within the scope of the present invention, and be protected by the accompanying claims.

BRIEF DESCRIPTION OF THE DRAWINGS

Referring now to the drawings, wherein like elements are numbered alike in the several FIGURES.

DETAILED DESCRIPTION OF THE INVENTION

In accordance with exemplary embodiments, methods for facilitating application development are disclosed. The modified Model-View-Controller (MVC) framework of the invention allows for rapid application development and simple application integration and enhancement whereby most of the development is left to simple configuration rather than complex code development. The flexibility of the modified MVC framework's implementation provides custom application-specific extensions while maintaining a standard interface at each level to ensure simple integration. The implementation of the standard interface combined with a standard data structure (i.e., page token), eliminates the need for coding controller and model components. The page token object introduces the concept of an abstract model which is integrated with the view component to provide a more data-driven aspect to the existing MVC model architecture.

Figure 1:
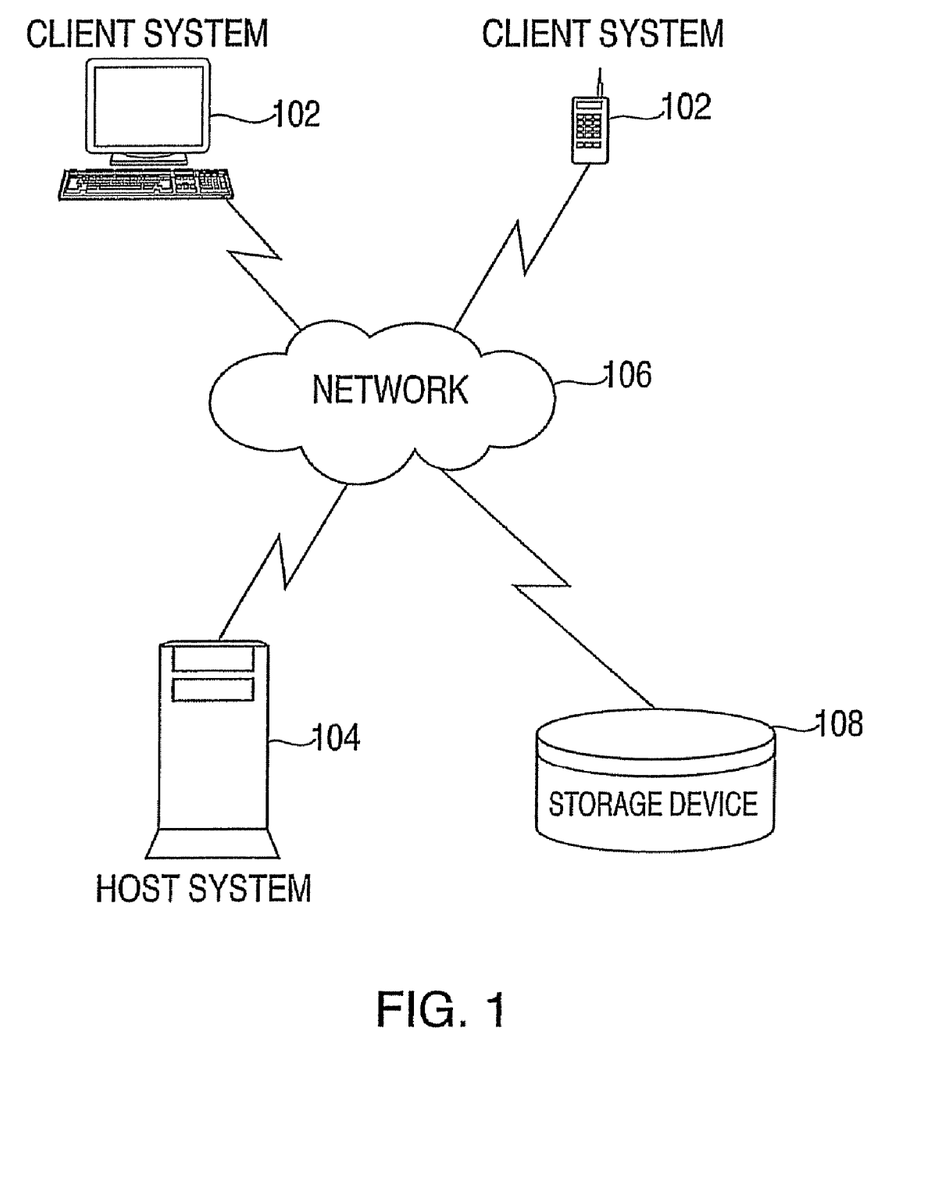
FIG. 1 is a block diagram of a system upon which the modified MVC framework may be implemented in exemplary embodiments.

In FIG. 1, a block diagram of an exemplary system upon which the modified MVC framework may be implemented is generally shown. The system of FIG. 1 includes one or more client systems 102 through which users at one or more geographic locations may contact a host system 104. The host system 104 executes computer instructions for implementing the modified MVC framework and the client systems 102 are in communication with the host system 104 via a network 106. Client systems 102 interact with host system 104 by initiating one or more requests. Client systems 102 may be one of many different types of client systems, e.g., a personal computer that initiates HTTP requests via a web browser (or a full-featured interface such as a rich client that is written with, e.g., J2SE technology), a mobile computing device such as a personal digital assistant (PDA) or cellular telephone that initiate requests using Wireless Markup Language (WML), or a server (e.g., a web service peer that requests services with Electronic Business XML (ebXML) or Simple Object Access Protocol (SOAP) messages).

The network 106 may be any type of known network including, but not limited to, a wide area network (WAN), a local area network (LAN), a global network (e.g., Internet), a virtual private network (VPN), and an intranet. The network 106 may be implemented using a wireless network or any kind of physical network implementation known in the art. A client system 102 may be coupled to the host system 104 through multiple networks (e.g., intranet and Internet) so that not all client systems 102 are coupled to the host system 104 through the same network. One or more of the client systems 102 and the host system 104 may be connected to the network 106 in a wireless fashion. In one embodiment, the network is an intranet and one or more client systems 102 execute a user interface application (e.g., a web browser) to contact the host system 104 through the network 106, while another client system 102 is directly connected to the host system 104. In another exemplary embodiment, the client system 102 is connected directly (i.e., not through the network 106) to the host system 104 and the host system 104 is connected directly to or contains a storage device 108.

The storage device 108 may be implemented using a variety of devices for storing electronic information. It is understood that the storage device 108 may be implemented using memory contained in the host system 104 or it may be a separate physical device. The storage device 108 is logically addressable as a consolidated data source across a distributed environment that includes a network 106. Information stored in the storage device 108 may be retrieved and manipulated via the host system 104. The storage device 108 includes a data repository containing documents, data, web pages, images, multi-media, etc. Further, storage device 108 stores configuration files (also referred to herein as page tokens). In an exemplary embodiment, the host system 104 operates as a database server and coordinates access to application data including data stored on storage device 108.

The host system 104 depicted in FIG. 1 may be implemented using one or more servers operating in response to a computer program stored in a storage medium accessible by the server. The host system 104 may operate as a network server (e.g., a web server) to communicate with the client system 102. The host system 104 handles sending and receiving information to and from the client system 102 and can perform associated tasks. Host system 104 executes various applications utilizing the modified MVC framework.

The host system 104 may also include a firewall to prevent unauthorized access to the host system 104 and enforce any limitations on authorized access. For instance, an administrator may have access to the entire system and have authority to modify portions of the system. A firewall may be implemented using conventional hardware and/or software, as is known in the art.

The host system 104 may also operate as an application server. The host system 104 executes one or more computer programs to implement business logic and related functions. As previously described, it is understood that separate servers may be utilized to implement the network server functions and the application server functions. Alternatively, the network server, the firewall, and the application server may be implemented by a single server executing computer programs to perform the requisite functions.

Figure 2:
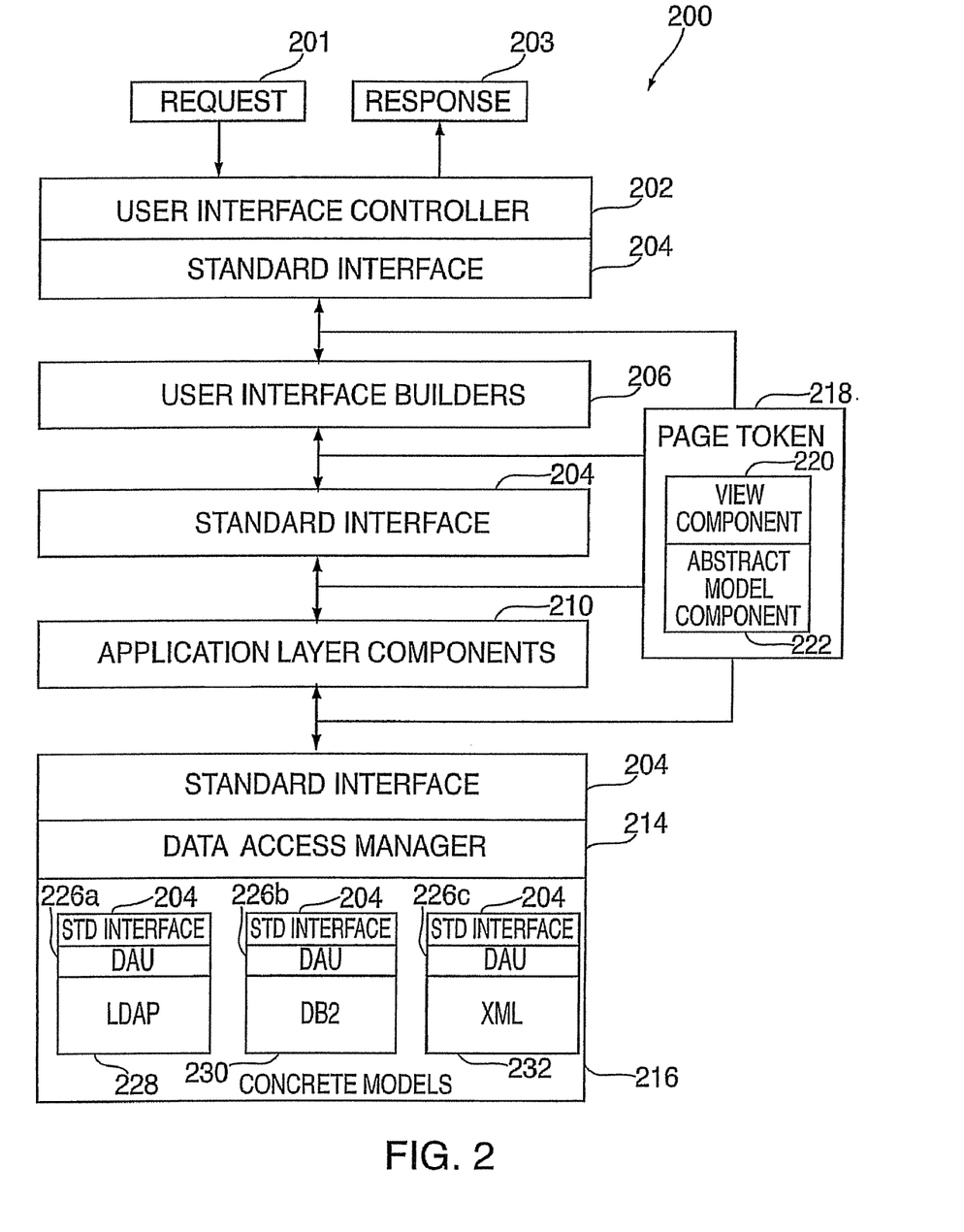
FIG. 2 is a diagram of the modified MVC framework and its components in exemplary embodiments.

Turning now to FIG. 2, an exemplary model of the modified MVC framework 200 is described. Also shown in FIG. 2 is a request 201 and response 203. A request 201 may be a browser-initiated HTTP request, or may be a request for data, a document, image, or other content. The request 201 may also be a search request or a request to launch an application. Response 203 refers to the results of the request processing. Response 203, for example, might be a web page, search result, etc. Requests and responses are handled by the user interface controller 202 as described herein.

User interface controller 202 employs, e.g., a standard Java Action Servlet for managing configuration information as well as creating session-associated information (e.g., creating and destroying objects required by an application). User interface controller 202 also manages panel flow using the configuration information and status information received from the page token 218 via a standard interface 204. Standard interface 204 (as well as standard interfaces 208, 212, and 224a-224c) enables and facilitates the independent functionality of the various elements that comprise the modified MVC framework model 200.

Also included in the modified MVC framework model 200 is a page token 218. Page token 218 is a data structure that contains a view component 220 and an abstract model component 222. The page token 218 is passed back and forth between model 200 components including: the user interface controller 202, one of the user interface builders 206, one of the application layer components 210, and zero or more data access utilities 226a-c via the data access manager 214 during the request and response processes. The abstract model component 222 contains a specification for obtaining data to be sent in a response 203 or updating data obtained from the request 201. The view component 220 contains a specification for formatting a response (e.g., a web page) and also referentially specifies how data from the abstract model component 222 will be formatted in the view.

The user interface builder 206 interacts with user interface controller 202 via the standard interface 204 described above. An application layer 210 provides a set of high-level application programming interfaces (APIs) for handling the page token 218, and includes functionality to perform paging, searching, and standard validation (e.g., checking required fields). Application layer 210 may be extended as necessary to apply business logic such as custom validation functions. For example, application layer 210 manages requests sent via the data access manager 214 to the concrete models 216 if default interaction is not desired via the implementation of custom business logic. Business logic is applied by updating the page token 218 as it is received from a user interface builder 206 or after it has been updated by one or more of concrete models 216. Additionally, a single piece of business logic may produce many page formats by updating the page token 218 as needed.

The modified MVC model 200 includes a set of standard user interface builders 206 that interact with the application layer 210 using a standard interface 208 which performs requests to update the page token 218 associated with the current panel or panel flow. This enables the modified MVC framework 200 to provide a standardized way of building all like panels, e.g. all add panels, all modify panels, all delete panels, all list panels, and all search panels. User interface builders 206 use the view component 220 of page token 218 to identify what fields, data, and text should be placed on the panel as well as in which format to place them. Further, user interface builders 206 handle the 'plumbing' associated with obtaining data from a client request by placing this data into the page token 218 so that the business logic can be used to validate the request data without having to write the code to obtain it. These user interface builders 206 may be extended if the needed type is not available in the existing framework as described further herein. Once extended, they become immediately available as standard page types.

Also included in modified MVC framework model 200 are data access manager 214 and concrete models 216. As indicated above, the abstract model component 222 of page token 218 contains a specification for obtaining data to be sent in a response 203 or updating data obtained from a request 201.

This specification is then routed by the data access manager 214 to be translated into data store specific procedures by a translation layer provided by data access utilities 226a-226c implemented in concrete models 216. By performing translation of the specification at this location in the framework, data store independent functionality may be achieved, thereby eliminating the need to write code to access a data store.

Concrete models 216 represent a collection of objects responsible for managing data sources, such as data sources 228-232. This collection may consist of objects that manage one or more such sources comprising a variety of types (e.g., IBM's DB2™ 230, Lightweight Directory Access Protocol (LDAP) 228, eXtensible Markup Language (XML) 232, Structured Query Language (SQL), etc.). There may also be as many different data sources as an application requires (e.g., multiple DB2 databases or a DB2 database and an LDAP database). Standard interfaces 224a-224c enable specific actions such as add, delete, modify, and query to be applied to one or more data sources for each page.

As indicated above, a translation layer is provided by each data access utility 226a-226c to enable the abstract model component 222 to be applied in the language of the underlying data store. Since multiple data sources (e.g., 228-232) are managed by the data access manager 214, it is possible to join data obtained from any of the underlying data stores without suffering performance degradation traditionally associated with join operations. This standard interface for a data access utility enables newly developed concrete model objects to become immediately re-useable by any application using this framework.

Figure 3:
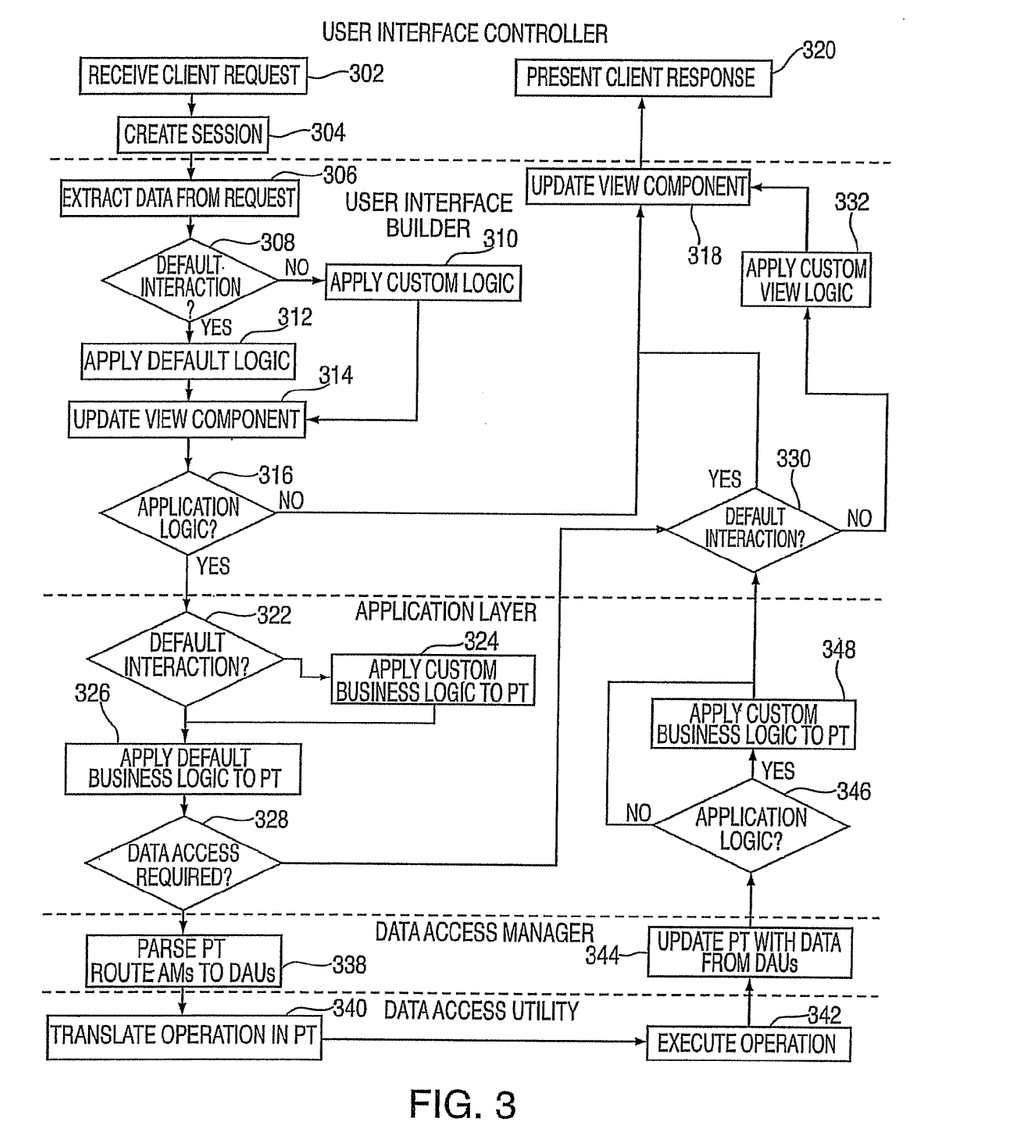
FIG. 3 represents a flow diagram describing an illustrative implementation of the modified MVC framework in exemplary embodiments.

Turning now to FIG. 3, a flow diagram describing a sample implementation of the modified MVC framework is described. A client request 201 generated by a user at client system 102 is received by the user interface controller 202 on host system 104 at step 302. The user interface controller 202 may include state machine information that enables controller 202 to keep track of the page flow. The user interface controller 202 initializes the page token 218, creates a session for the request at step 304, and passes the page token 218 to a user interface builder 206. The user interface builder 206 extracts data from the request 201 at step 306.

At step 308, it is determined whether default interaction is required for the request 201. If not, custom logic is applied to the request 201 at step 310. The extensibility of the user interface builders 206 as described in steps 308-310 enable an application developer to provide custom code to the user interface builder 206 in situations where the configuration information in the page token does not satisfy the requirements needed or the results desired by the developer. For example, a developer may wish to provide a standard validation procedure that is built into the user interface builder 206. This may be accomplished by the custom logic in step 310.

If default interaction is required at step 308, the default logic is applied to the request at step 312. The view component 220 is then updated to reflect the application of the default logic from step 312, or alternatively, to reflect the application of the custom logic from step 310 at step 314. At step 316, it is determined whether application logic is required for the request 201. This step determines whether the flow will proceed to the application layer 210 for applying business logic and further processing or whether such application of business logic is not required, whereby the flow will return to the user interface controller 202. If no application logic is required at step 316, the user interface builder 206 updates the view component 220 at step 318 and presents a response 203 to the requesting client system 102 at step 320.

For example, using the example above, if a custom validation procedure is performed at step 310 and no application logic is required at step 316, then a message (e.g., validation failed) may be presented at step 320. The user interface builder 206 handles the view, e.g., builds a web page, updates the view component 220, and sends the view (i.e., response) to user interface controller 202, which transforms the view into a format recognized by the requesting client system 102, and presents the result to the client system 102.

If on the other hand, it is determined that application logic is required at step 316, the user interface builder 206 calls, e.g., a validation method or subroutine in the application layer 210 via the standard interface 208. It is then determined whether default interaction is required within the application layer 210 at step 322. If not, custom business logic is applied to the page token 218 at step 324. Similar to steps 308-310 recited above, steps 322-324 enable an application developer to extend the utility of a configuration file in a page token 218 if desired by providing customized code. For example, if a page flow requires that information be gathered from different screens and a request is sent to a web service for further action, then custom business logic may be needed to handle this complex page flow. Handling logic associated with password account administration is another example of a workflow that may require custom business logic.

If, on the other hand, default interaction is required at step 322, the default logic is applied to the page token 218 at step 326. An example of default business logic may include validating forms. Once the default logic has been applied at step 326, or alternatively, once the custom business logic has been applied at step 324, it is then determined whether data access is required at step 328. This step determines whether the flow returns to the user interface builder 206 or whether the flow proceeds to the data access manager 214. If no data access is required, then the page token 218 is passed back to the user interface builder 206.

Once again it is determined whether default interaction is required for the page token 218 at step 330. If not, then custom view logic is applied to the page token 218 at step 332, followed up updating the view component 220 to reflect this application of logic at step 318. A response is then presented to the client via the user interface controller at step 320. If default interaction is required at step 330, the view component 220 is updated at step 318 to prepare it for transformation by the User Interface Controller.

Returning back to step 328, if data access is required, the application layer 210 calls a subroutine or method via standard interface 212 and the page token 218 is passed to the data access manager 214. The data access manager 214 parses the abstract model component 222 of the page token 218 into abstract component pieces or segments, if needed, and calls method or subroutine via standard interface 224a-c and passes the segments (or the entire abstract model component 222 if no segmentation is required) to one or more of the corresponding data access utilities 226a-c at step 338. The data access utilities 226a-c translate the operation provided in the abstract model component 222, or segments, into the language recognized by their respective concrete model data stores (e.g., LDAP 228, XML 232, DB2™ 230, etc.) at step 340. The operation is executed (e.g., search, retrieve, add, delete, etc.) at step 342. The results are then returned to the data access manager 214 which reassembles the page token (e.g., aggregates the various abstract model component segments received from the data access utilities 226a-c via standard interfaces 224a-c, respectively), updates the page token 218 with the data received from the data access utilities 226a-c at step 344, and passes the page token 218 back to the application layer 210.

At step 346, it is determined whether application logic is required. If so, custom business logic is applied to the page token 218 at step 348. Once the custom logic has been applied at step 348, or alternatively, if no application logic is required at step 346, the page token is passed to the user interface builder. At step 330, it is again determined whether default interaction is desired. If so, then the view component 220 is updated to reflect the data access transaction at step 318, and the client is presented with a response at step 320. Otherwise, custom view logic is applied to the page token 218 at step 332, followed by updating the view component as described in step 318.

As described above, the modified Model-View-Controller (MVC) framework 200 of the invention allows for rapid application development and simple application integration and enhancement whereby most of the development is left to simple configuration rather than complex code development. The flexibility of the modified MVC framework's implementation provides custom application-specific extensions while maintaining a standard interface at each level to ensure simple integration. The implementation of the standard interface combined with the standard data structure (i.e., page token), eliminates the need for coding controller and model components. The page token object introduces the concept of an abstract model which is integrated with the view component to provide a more data-driven aspect to the existing MVC model architecture.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

The invention claimed is:

1. A computer program product extending functionality of a model-view-controller architecture, said computer program product comprising a computer readable storage medium storing components of a modified model-view controller architecture, the components of the modified model-view controller architecture including:
   a user interface controller;
   a user interface builder, wherein the user interface controller is in communication with the user interface builder via a first interface;
   an application layer, wherein the user interface builder is in communication with application layer via a second interface;
   program code for generating a page token comprising an abstract model component containing a specification for obtaining data designated to be sent in a response to a request or updating data obtained from a request, and a view component for providing referential format specifications for data provided in the abstract model component, wherein the response comprises an entire web page including a current panel;
   wherein the page token is initialized by the user interface controller and passed to one of the components via the first interface;
   program code for applying business logic to contents of the page token as a result of passing, and a response to the request is presented based upon results of applying the business logic; and
   a data access manager, wherein the application layer is in communication with the data access manager via a third interface, wherein in response to receiving the page token from the application layer, the data access manager parses the abstract model component and sends parsed data to at least one data access utility associated with the parsed data, wherein the data access manager is in communication with the at least one data access utility via a fourth interface;
   wherein the data access manager sends at least a portion of the page token, including the specification, to the at least one data access utility via the fourth interface for use by the at least one data access utility in accessing data in a data store.

2. The computer program product of claim 1 wherein the:
   at least one data access utility is associated with one or more concrete models and translates the parsed data into a language understood by corresponding data stores, executes an operation specified in the parsed data, and returns results of the executed operation to the data access manager.

3. The computer product of claim 2 wherein in response to receiving the results of the executed operation, the data access manager updates the page token with the results and passes the page token back to the application layer.

4. The computer program product of claim 3 wherein in response to receiving the page token, the application layer applies business logic and passes the page token back to the user interface builder.

5. The computer program product of claim 4 wherein in response to receiving the page token, the user interface builder formats the data in the page token into a page for viewing and passes the page back to the user interface controller.

6. A computer program product for presenting a response based upon an application of business logic in accordance with a request, said computer program product comprising:
   a computer readable storage medium;
   first program instructions for initializing a page token in response to receiving a request, the page token comprising an abstract model component containing a specification for obtaining data designated to be sent in a response to the request or a specification for updating data obtained from the request, and a view component for providing referential format specifications for the data provided in the abstract model component, wherein the response comprises an entire web page including a current panel;

second program instructions for passing the page token between at least two components of a modified model-view-controller architecture via an interface, the components of the modified model-view controller architecture including:

a user interface controller;

a user interface builder implementing a first interface;

an application layer implementing a second interface;

a data access manager implementing a third interface; and at least one data access utility implementing a fourth interface;

third program instructions for applying, by the application layer, business logic to the contents of the page token as a result of passing; and fourth program instructions for presenting a response to the request based upon results of the applying business logic; wherein said first, second, third and fourth program instructions are stored on said computer readable storage medium;

wherein:

the user interface controller interacts with the user interface builder via the first interface;

the user interface builder interacts with the application layer via the second interface;

the application layer interacts with the data access manager via the third interface; and the data access manager sends at least a portion of the page token, including the specification, to the at least one data access utility via the fourth interface for use by the at least one data access utility in accessing data in a data store.

7. The computer program product of claim 6, wherein the request includes at least one of:

a browser-initiated hypertext transport protocol request;

a request for at least one of data, a document, an image, and multi-media content;

a search request; and a request to launch an application.

8. The computer program product of claim 7, further comprising:

fifth program instructions for updating the page token via at least one of:

default business logic, wherein the default business logic is applied by a call to the at least one data access utility, and the page token is updated with data from a data store or data from the user interface builder configured for rendering panels; and custom business logic, wherein the custom business logic is applied by a call to the application layer, and wherein the custom business logic is configured for updating data retrieved or for updating a view.

9. The computer program product of claim 6, further comprising sixth program instructions for managing panel flow via the user interface controller, wherein the panel flow is managed using specification information in the page token and machine status information tracked by the user interface controller.

10. The computer program product of claim 9, wherein the user interface builder performs:

extracting data from the request and placing extracted data into the page token;

identifying fields, data, and text designated for placement on a current panel; and identifying a format for the fields, data, and text.

11. The computer program product of claim 10, wherein the data access manager performs:

parsing the specification contained in the abstract model component into segments, each of the segments classified by a corresponding data store associated with a data access utility;

translating each of the segments using the data access utility associated with a data store specified by the segment, the translating including translating each of the segments into a language understood by the data store;

executing an operation based upon results of the translating;

updating the segments to reference the results when the operation executed is one that yields results;

aggregating the segments in the abstract model component of the page token; and passing the page token back to the application layer.

12. A method in a data processing system for presenting a response based upon an application of business logic in accordance with a request, where the data processing system comprises a modified model-view-controller architecture that includes a user interface controller, a user interface builder implementing a first interface, an application layer implementing a second interface, a data access manager implementing a third interface, and at least one data access utility implementing a fourth interface, wherein the interface controller interacts with the user interface builder via the first interface, the user interface builder interacts with the application layer via the second interface, the application layer interacts with the data access manager via the third interface, the method comprising:

initializing, by the data processing system, a page token in response to receiving a request, the page token comprising an abstract model component containing a specification for obtaining data designated to be sent in a response to the request or a specification for updating data obtained from the request, and a view component for providing referential format specifications for the data provided in the abstract model component, wherein the response comprises an entire web page including a current panel;

passing, by the data processing system, the page token between at least two components of the modified model-view-controller architecture via an interface;

applying, by the application layer, business logic to contents of the page token as a result of the passing; and presenting, by the data processing system, a response to the request based upon results of the applying business logic;

wherein the data access manager sends at least a portion of the page token, including the specification, to the at least one data access utility via the fourth interface for use by the at least one data access utility in accessing data in a data store.

13. The method of claim 12, wherein the request includes at least one of:

a browser-initiated hypertext transport protocol request;

a request for at least one of data, a document, an image, and multi-media content;

a search request; and a request to launch an application.

14. The method of claim 13, further comprising updating, by the data processing system, the page token via at least one of:

default business logic, wherein the default business logic is applied by a call to the at least one data access utility, and the page token is updated with data from a data store or data from the user interface builder configured for rendering panels; and custom business logic, wherein the custom business logic is applied by a call to the application layer, and wherein the custom business logic is configured for updating data retrieved or for updating a view.

15. The method of claim 12, wherein:

the user interface controller interacts with the user interface builder via the first interface;

the user interface builder interacts with the application layer via the second interface;

the application layer interacts with the data access manager via the third interface; and the data access manager interacts with the at least one data access utility via the fourth interface.

16. The method of claim 12, further comprising managing panel flow via the user interface controller, wherein the panel flow is managed using specification information in the page token and machine status information tracked by the user interface controller.

17. The method of claim 16, wherein the user interface builder performs:

extracting data from the request and placing extracted data into the page token;

identifying fields, data, and text designated for placement on a current panel; and identifying a format for the fields, data, and text.

18. The method of claim 17, wherein the data access manager performs:

parsing the specification contained in the abstract model component into segments, each of the segments classified by a corresponding data store associated with a data access utility;

translating each of the segments using the data access utility associated with a data store specified by the segment, the translating including translating each of the segments into a language understood by the data store;

executing an operation based upon results of the translating;

updating the segments to reference the results when the operation executed is one that yields results;

aggregating the segments in the abstract model component of the page token; and passing the page token back to the application layer.

19. A system for presenting a response based upon an application of business logic in accordance with a request, the system comprising:

a central processing unit (CPU), a computer readable memory and a computer readable storage media;

first program instructions for initializing a page token in response to receiving a request, the page token comprising an abstract model component containing a specification for obtaining data designated to be sent in a response to the request or a specification for updating data obtained from the request, and a view component for providing referential format specifications for the data provided in the abstract model component, wherein the response comprises an entire web page including a current panel;

second program instructions for passing the page token between at least two components of a modified model-view-controller architecture via an interface, the components of the modified model-view-controller architecture including:

a user interface controller;

a user interface builder implementing a first interface;

an application layer implementing a second interface;

a data access manager implement a third interface; and at least one data access utility implementing a fourth interface;

third program instructions for applying, by the application layer, business logic to contents of the page token as a result of the passing;

fourth program instructions for presenting a response to the request based upon results of the applying business logic;

wherein the user interface controller interacts with the user interface builder via the first interface, the user interface builder interacts with the application layer via the second interface, the application layer interacts with the data access manager via the third interface, and the data access manager sends at least a portion of the page token, including the specification, to the at least one data access utility via the fourth interface for use by the at least one data access utility in accessing data in a data store; and wherein the first, second, third, and fourth program instructions are stored on the computer readable storage media for execution by the CPU via the computer readable memory.

* * * * *